United States Patent
Takei et al.

(10) Patent No.: US 7,724,449 B2
(45) Date of Patent: May 25, 2010

(54) LENS DRIVE DEVICE AND COIL WINDING METHOD

(75) Inventors: Yuichi Takei, Nagano (JP); Daisuke Higuchi, Nagano (JP); Takeshi Sue, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/271,354

(22) Filed: Nov. 14, 2008

(65) Prior Publication Data

US 2009/0122419 A1    May 14, 2009

(30) Foreign Application Priority Data

Nov. 14, 2007    (JP)    ............... 2007-295359

(51) Int. Cl.
   *G02B 15/14*    (2006.01)
(52) U.S. Cl. ...................................... 359/704; 359/696
(58) Field of Classification Search ................. 359/422, 359/425, 696, 704; 396/85, 133
   See application file for complete search history.

(56) References Cited

U.S. PATENT DOCUMENTS

2009/0022487 A1*    1/2009    Weng et al. ................. 396/133

FOREIGN PATENT DOCUMENTS

JP    2007-94364    4/2007

* cited by examiner

*Primary Examiner*—Joseph Martinez
(74) *Attorney, Agent, or Firm*—Cantor Colburn LLP (57) ABSTRACT

A lens drive device may include a movable body, a support body supporting the movable body through a spring member, and a magnetic drive mechanism provided with a coil. The movable body includes a coil winding part, end parts for restricting a range of the coil winding part, and a changing part for changing a drawing direction of the coil. The spring member is disposed near the other end part of the movable body and electrically connected with winding start and winding end of the coil. A coil winding method for the lens drive device may include a drawing step in which a coil is drawn between end parts, a changing step in which a drawing direction of the coil is changed by the changing part, and a winding step in which the coil is wound around the coil winding part.

10 Claims, 5 Drawing Sheets

LENS DRIVE DEVICE AND COIL WINDING METHOD

CROSS REFERENCE TO RELATED APPLICATION

The present invention claims priority under 35 U.S.C. §119 to Japanese Application No. 2007-295359 filed Nov. 14, 2007 the entire contents of which are incorporated herein by reference.

FIELD OF THE INVENTION

At least an embodiment of the present invention may relate to a lens drive device in which a lens is moved in an optical axis direction to form an image of an object to be photographed and a coil winding method which is suitable for the lens drive device.

BACKGROUND OF THE INVENTION

As cell phones with cameras in which a camera is mounted have become popular in recent years, chances photographing various objects to be photographed by using the cell phone have increased. For example, there is a case that an object such as a friend or landscape which is apart from a lens of a camera to some extent is photographed (normal photographing) and, alternatively, there is a case that an object such as a timetable for bus or petals of a flower at a position near the lens of the camera is photographed (close-up photographing).

In the close-up photographing (macro-photographing), a lens position of a camera is required to locate at a position nearer on an object side than a lens position at the time of normal photographing. Therefore, this type of photographing lens system is provided with a drive mechanism for driving a lens to move in the optical axis direction. The drive mechanism is driven by changing a switch to move a lens in the optical axis direction (see, for example, Japanese Patent Laid-Open No. 2007-94364).

The lens drive device which is disclosed in the above-mentioned Patent Reference includes a movable lens body, a drive mechanism for moving the movable lens body in an optical axis direction, a fixed body which movably supports the movable lens body in the optical axis direction, and a restriction means (plate spring) for restricting movement of the movable lens body. The drive mechanism includes a magnet and a coil. In the structure as described above, while an electric current is supplied to the coil to generate an electromagnetic force, a restriction force against the electromagnetic force is generated by the restriction means. Magnitudes of both the restriction force and the electromagnetic force are adjusted to be capable of stopping the movable lens body at a desired position.

In this structure, the above-mentioned restriction means (plate spring) also functions as an electrical contact with an external apparatus (for example, a cell phone with camera) into which the lens drive device is assembled. The restriction means which functions as the electrical contact is commonly disposed at a lower end of the lens drive device (image sensor element side). When the coil is structured so that the coil is divided into two upper-and-lower layers, at first, for example, a coil has been wound around for a lower layer and next, the oil is wound around for an upper layer. For a winding start portion in the lower layer, a successively winding wire is wound around on the wire which has been wound first and thus the winding start portion hardly come loose.

However, for a winding end portion in the upper layer, different from the winding start portion in the lower layer, there is no holding part for the wire and thus the winding end portion comes loose easily.

In other words, in a case that the coil has a structure divided into two upper-and-lower layers, in order to connect a lower layer coil to an upper layer coil, the lower layer coil is wound around so as to be formed in an odd-number of layers toward an outer side in a radial direction of the movable lens body (movable body). In addition, when the same number of layers is wound around for both the upper layer and the lower layer in order to generate substantially the same electromagnetic force in the upper layer and the lower layer, a winding end portion of the upper layer coil is located on an opposite side to a winding start portion (near an upper end of the movable lens body). In this case, when the winding end portion of the coil is temporarily fixed with an adhesive or the like and then the winding end portion of the coil is drawn to the lower part of the movable lens body, the winding end portion may easily come loose. On the contrary, when the coil is firstly wound around on the upper layer side, the winding start portion may become loose easily. Further, this problem may also occur in a structure that the coil is not divided into the two upper-and-lower layers.

SUMMARY OF THE INVENTION

In view of the problems described above, at least an embodiment of the present invention may advantageously provide a lens drive device and a coil winding method which are capable of preventing a coil wire from coming loose.

In order to solve the problems described above, at least an embodiment of the present invention provides as follows.

According to at least an embodiment of the present invention, there may be provided a lens drive device including a movable body which holds a lens and is movable in an optical axis direction, a support body which supports the movable body through a spring member, and a magnetic drive mechanism which is provided with a coil for driving the movable body in the optical axis direction. The movable body includes a coil winding part around which the coil is wound, the first end part and the second end part for restricting a range of the coil winding part in the optical axis direction, and a changing part which is formed in the first end part for changing a drawing direction of the coil. The spring member is disposed near the second end part of the movable body to be electrically connected with a winding start and a winding end of the coil.

According to at least an embodiment of the present invention, in a lens drive device including a movable body, a support body and a magnetic drive mechanism, the movable body includes a coil winding part, the first end part and the second end part for restricting a range of the coil winding part in the optical axis direction, and a changing part which is formed in the first end part for changing a drawing direction of the coil. In addition, a spring member which is electrically connected with a winding start and a winding end of the coil is disposed near the second end part of the movable body which is different from the first end part where the changing part is formed. According to this structure, a drawing direction of the coil is changed by the changing part at a position near the winding start or the winding end of the coil and thus a tension can be applied to the coil. As a result, the coil wire can be prevented from coming loose.

Especially, in a conventional lens drive device, when a coil is drawn to an end part where a spring member as an electrical contact is disposed from an opposite end part, the drawing work is often required to be conducted by hand. However, according to the lens drive device in accordance with at least an embodiment of the present invention, since a tension can be applied to the coil by the changing part, a winding work of the coil can be performed by a machine such as a coil winding machine and, as a result, a winding time of the coil can be shortened. In addition, when a coil winding machine is used, workability can be improved.

In the lens drive device described above, it is preferable that the coil includes a drawn part which is drawn from the second end part to the first end part where the changing part is formed and, after a drawing direction of the coil is changed by the changing part, the coil is wound around on an outer side with respect to the drawn part in a radial direction of the movable body.

According to at least the embodiment structured above, the coil includes a drawn part which is drawn from the second end part to the first end part where the changing part is formed and, after a drawing direction of the coil is changed by the changing part the coil is wound around on an outer side with respect to the drawn part in a radial direction of the movable body. Therefore, the drawn part can be prevented from contacting with other parts and thus disconnection of the drawn part of the coil can be prevented.

Further, in the lens drive device described above, it is preferable that the coil winding part is formed with a recessed part for accommodating the drawn part.

According to the structure described above, the coil winding part is formed with a recessed part for accommodating the drawn part. Therefore, when the coil is wound around on an outer side of the drawn part in the radial direction, the coil does not protrude or is not formed to protrude at the portion of the drawn part and thus a regular winding can be performed satisfactorily. Further, since the drawn part does not protrude, a size of the lens drive device can be reduced.

In the lens drive device described above, it is preferable that the movable body is provided with a coil guide part for reversing a winding direction of the coil in a circumferential direction of the movable body. In this case, it is preferable that the movable body is provided with an intermediate end part between the first end part and the second end part, and the intermediate end part is provided with the coil guide part. In addition, in the lens drive device, it is preferable that a first coil winding part is formed between the first end part and the intermediate end part, and a second coil winding part is formed between the intermediate end part and the second end part, and magnets are disposed so as to face the first coil winding part and the second coil winding part respectively, and faces of the magnets opposite to the first coil winding part and the second coil winding part are respectively magnetized to be different poles from each other.

According to the structure described above, the movable body is provided with a coil guide part for reversing a winding direction of the coil in a circumferential direction of the movable body. Therefore, in a case that the coil is divided into two upper-and-lower layers and, even when winding directions are required to be reversed in the upper layer and the lower layer, the winding direction of the coil can be easily reversed through the coil guide part.

In addition, it is preferable that the coil is wound around in an odd number of layers on an outer side in a radial direction of the movable body.

According to the structure as described above, the coil is wound around in an odd number of layers on an outer side in a radial direction of the movable body. Therefore, when the coil is divided into two upper-and-lower layers, while a winding number of the coil is increased, the coil can be drawn from the upper layer to the lower layer or the coil can be drawn from the lower layer to the upper layer.

According to at least an embodiment of the present invention, there may be provided a coil winding method for a lens drive device which is provided with a movable body which holds a lens and is movable in an optical axis direction, a support body which supports the movable body through a spring member, and a magnetic drive mechanism which is provided with a coil for driving the movable body in the optical axis direction, and the movable body is provided with a coil winding part around which the coil is wound, the first end part and the second end part for restricting a range of the coil winding part in the optical axis direction, and a changing part which is formed in the first end part for changing a drawing direction of the coil, includes: drawing a coil from the second end part to the first end part where the changing part is formed; changing a drawing direction of the coil by the changing part; winding the coil around the coil winding part to wind the coil around the movable body.

According to at least an embodiment of the present invention, in a lens drive device which is provided with a movable body, a support body, a magnetic drive mechanism, and a changing part which is formed in the first end part for changing a drawing direction of the coil, the coil winding method includes drawing a coil from the second end part to the first end part where the changing part is formed, changing a drawing direction of the coil by the changing part, and winding the coil around the coil winding part to wind the coil around the movable body. Therefore, a winding direction of the coil is changed through the changing and a tension can be applied to the coil and, as a result, the coil can be prevented from coming loose.

In the coil winding method described above, it is preferable that the movable body is provided with a coil guide part for reversing a winding direction of the coil in a circumferential direction of the movable body, and the winding includes a first winding in which the coil is wound around in a first direction, a reversing in which the winding direction of the coil is reversed in a circumferential direction of the movable body by the coil guide part, and a second winding in which the coil is wound around a second direction opposite to the first direction. In this case, it may be structured so that the movable body is provided with an intermediate end part between the first end part and the second end part, and a first coil winding part is formed between the first end part and the intermediate end part, and a second coil winding part which is formed between the intermediate end part and the second end part, and the intermediate end part is provided with the coil guide part and, after the first winding is performed, the coil is wound around in the second winding in a second direction opposite to the first direction through the coil guide part provided in the intermediate end part.

According to at least an embodiment of the present invention, the movable body is provided with a coil guide part for reversing a winding direction of the coil in a circumferential direction of the movable body, and the winding includes a first winding in which the coil is wound around in a first direction, a reversing in which the winding direction of the coil is reversed in the circumferential direction of the movable body by the coil guide part, and a second winding in which the coil is wound around a second direction opposite to the first direction. Therefore, even when the coil is divided into two upper-and-lower layers to be wound, the coil can be prevented from coming loose.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

Figure 1:
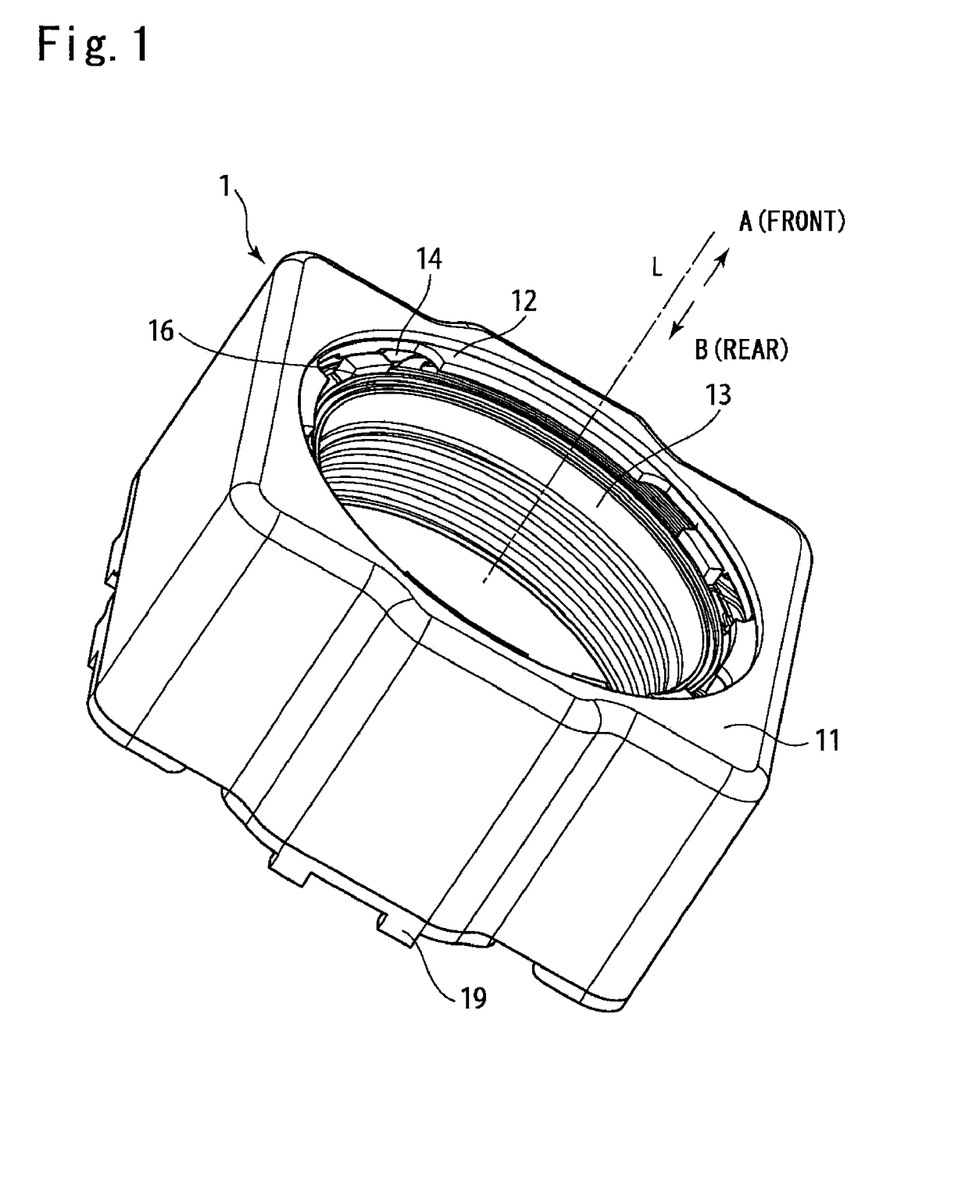
FIG. 1 is a perspective outward appearance view showing a lens drive device in accordance with at least an embodiment of the present invention.
Figure 2:
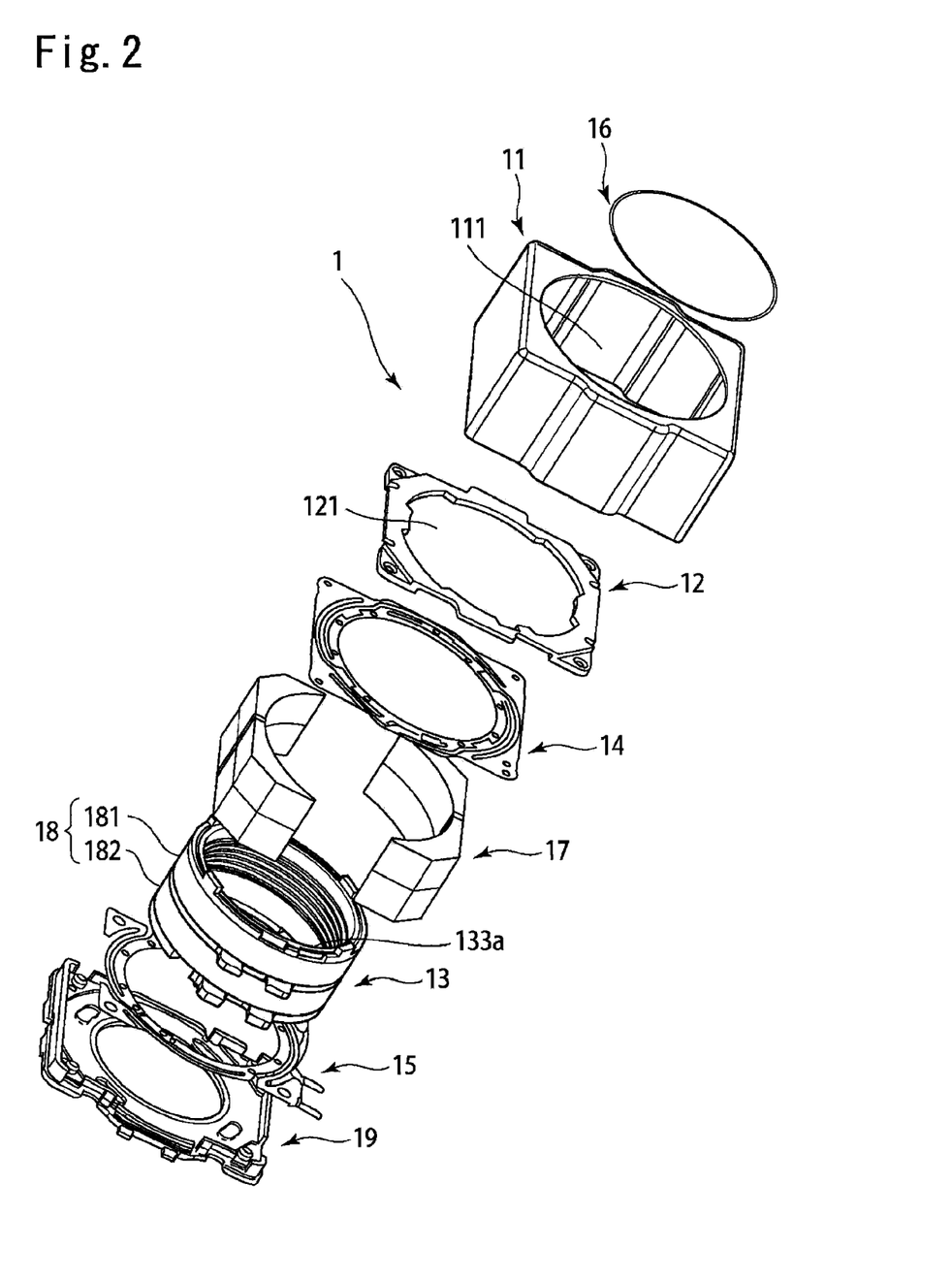
FIG. 2 is an exploded perspective view showing a mechanical structure of a lens drive device in accordance with at least an embodiment of the present invention.

FIG. 1 is a perspective outward appearance view showing a lens drive device 1 in accordance with an embodiment of the present invention. FIG. 2 is an exploded perspective view showing a mechanical structure of a lens drive device 1 in accordance with an embodiment of the present invention.

In FIGS. 1 and 2, the lens drive device 1 includes a yoke 11, a cover 12, a sleeve 13, a first plate spring 14, a second plate spring 15, a wire spring 16, a magnet 17, a coil 18 (a first coil 181 and a second coil 182) and a holder 19.

In this embodiment, a lens barrel into which a lens is assembled is not shown in the drawings. The lens drive device 1 moves the sleeve 13 along an optical axis "L" direction in both directions, i.e., an "A"-direction (front side) approaching to an object (imaging object) to be photographed and a "B"-direction (rear side) approaching to an opposite side (image side) to the object to be photographed (see FIG. 1). Further, the sleeve 13 which holds the lens barrel (not shown) into which one or plural lenses are assembled is structured so as to be movable in the direction of the optical axis "L" together with a wire spring 16 and the like, which correspond to an example of the "movable body". Further, the yoke 11, the cover 12, the holder 19 and the like correspond to an example of the "support body" which supports the sleeve 13 and the like so as to be movable in the direction of the optical axis "L" through the first plate spring 14 and the second plate spring 15. Further, the sleeve 13 and the like are driven in the direction of the optical axis "L" by a "magnetic drive mechanism" which is provided with the coil 18 and the magnet 17.

The yoke 11 is structured of a ferromagnetic plate such as a steel plate. Further, the yoke 11 is exposed as the front face and the side face of the lens drive device 1 and a circular incident aperture 111 is formed at its center for taking a reflected light from an object to be photographed to a lens. The cover 12 is mounted on the yoke 11 and a circular incident aperture 121 is formed at its center for taking the reflected light from the object to be photographed to the lens. The holder 19 holds an image sensor element (not shown) on the image side.

The coil 18 is structured of the first coil 181 and the second coil 182, which are disposed in two layers in the direction of the optical axis "L", and each is formed in a circular ring shape. The first coil 181 and the second coil 182 are wound around an outer peripheral face of the sleeve 13 so as to have a predetermined distance. Further, eight magnets 17 are superposed in two layers in the optical axis direction. Magnets 17 on the front side of the respective magnets 17 are faced with an outer peripheral side of the first coil 181 and the magnets 17 on the rear side are faced with an outer peripheral side of the second coil 182 and, as shown in FIG. 2, the eight magnets 17 are fixed to four corner parts of an inner peripheral face of the yoke 11 whose outer shape is formed in a roughly rectangular shape.

In this embodiment, each of the magnets 17 is magnetized so that its inside face and its outside face are magnetized to be different from each other. For example, four magnets 17 disposed on the front side are magnetized so that their inside faces are magnetized to be an "N"-pole and their outside faces are magnetized to be an "S"-pole, and four magnets 17 disposed on the rear side are magnetized so that their inside faces are magnetized to be an "S"-pole and their outside faces are magnetized to be an "N"-pole.

The first plate spring 14 and the second plate spring 15 are formed of a metal thin plate and their thicknesses in the direction of the optical axis "L" is set to be the same. Further, as shown in FIG. 2, the first plate spring 14 is attached to a front end face in the optical axis direction of the sleeve 13, and the second plate spring 15 is attached to a rear end face in the optical axis direction of the sleeve 13.

In this embodiment, as shown in FIG. 2, each of the first plate spring 14 and the second plate spring 15 includes a circular arc-shaped sleeve side mounting part, a cover side mounting part which is attached to the cover 12, and an arm part which is provided between the sleeve side mounting part and the cover side mounting part for restricting movement (urging) in the optical axis direction of the sleeve 13. The respective mounting parts are fixed by using welding, adhesion or both of them. Further, the second plate spring 15 is structured of two spring pieces which are electrically separated from each other and serve as a medium when an electric current is supplied to the coil 18 from an external power supply. A winding start and a winding end of the coil 18 are electrically connected to the respective spring pieces.

The yoke 11 is set to be larger than a dimension in the optical axis direction of a region where the first coil 181 and the second coil 182 are disposed and a dimension in the optical axis direction of the magnets 17. Therefore, leakage flux is reduced which is generated from a magnetic path structured between the front side magnets 17 and the first coil 181 and which is generated from a magnetic path structured between the rear side magnets 17 and the second coil 182. As a result, linearity between a moving amount of the sleeve 13 and an electric current supplied through the first coil 181 and the second coil 182 can be improved.

The lens drive device 1 is provided with a circular ring shaped wire spring (magnetic member) 16. The wire spring 16 applies an urging force in the direction of the optical axis "L" to the sleeve 13 on the basis of magnetic attractive forces acting between the magnets 17 and the wire spring 16. Therefore, the movable body (sleeve 13, etc.) can be prevented from being displaced by its own weight at a not-energized time of the coil and, as a result, the movable body (sleeve 13, etc.) is capable of maintaining a desired posture.

In the lens drive device 1 in accordance with at least an embodiment of the present invention, a winding method where the coil 18 (the first coil 181 and the second coil 182) is wound around the sleeve 13 is a specific point of at least an embodiment of the present invention. More specifically, the coil 18 is wound around by using a changing part 133a which is provided in the sleeve 13. A coil winding method using the changing part 133a will be described below with reference to FIGS. 3 through 7.

Figure 3:
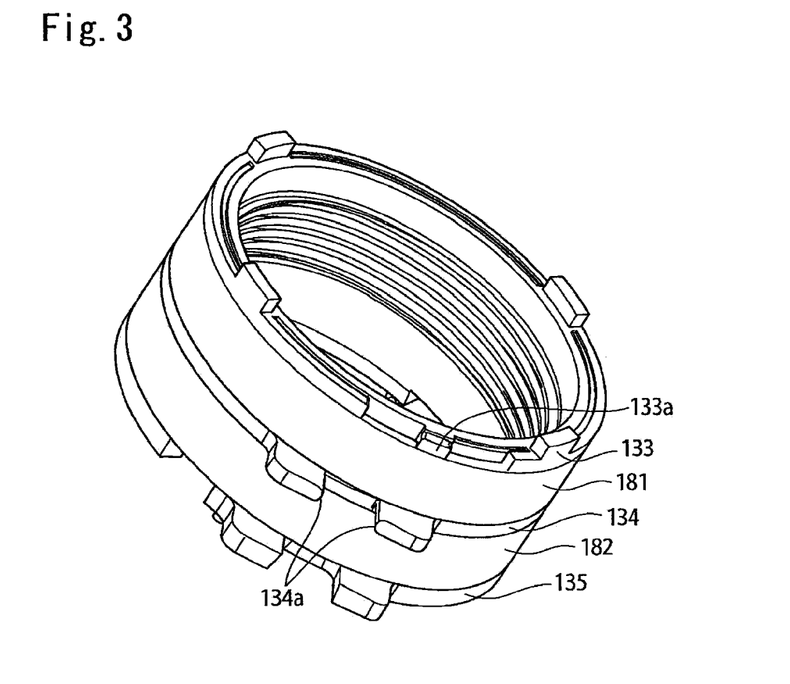
FIG. 3 is a perspective view showing a sleeve and a coil in the lens drive device.
Figure 4:
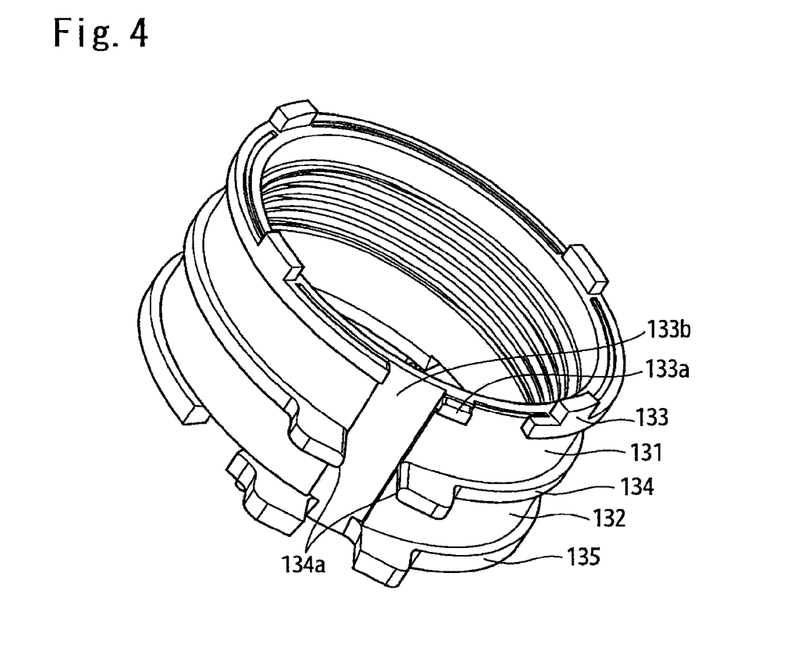
FIG. 4 is a perspective view showing the sleeve shown in FIG. 3 in which the coil is removed.

FIG. 3 is a perspective view showing the sleeve 13 and the coil 18 in the lens drive device 1. FIG. 4 is a perspective view showing the sleeve 13 shown in FIG. 3 in which the coil 18 is removed.

As shown in FIGS. 3 and 4, the sleeve 13 is formed so that the direction of the optical axis "L" is set to be its axis direction. The sleeve 13 includes a first coil winding part 131 around which the first coil 181 is wound, a second coil winding part 132 around which the second coil 182 is wound, both of which are formed in a recessed shape, and a first end part 133, a second end part 134 and a third end part 135, all of which guide the coil 18 to a predetermined position or in a predetermined winding direction. The second end part 134 is an intermediate end part which is formed between the first end part 133 and the third end part 135.

The first end part 133, the second end part 134 and the third end part 135 are also provided with a function for defining a range of the first coil winding part 131 and the second coil winding part 132 in the optical axis direction. In this embodiment, the inside faces of the four magnets 17 which are disposed on the front side are magnetized in an "N"-pole, and the inside faces of the four magnets 17 which are disposed on the rear side are magnetized in an "S"-pole. Therefore, winding directions of the first coil 181 and the second coil 182 which are wound around the first coil winding part 131 and the second coil winding part 132 are set to be in reverse directions each other. As a result, when an electric current is supplied to the coil 18, forces (thrust force) are generated in the same direction.

Specifically, a winding direction of the coil 18 is changed by a coil guide part 134a formed in the second end part 134, i.e., the intermediate end part which is disposed between the first coil winding part 131 and the second coil winding part 132. In other words, the winding direction of the coil 18 which is wound around the second coil winding part 132 (second coil 182) is changed into a reverse direction to the winding direction of the first coil 181 by the coil guide part 134a formed in the second end part 134. As described above, the coil guide part 134a is provided with a function for reversing the winding direction of the coil 18 in a circumferential direction of the sleeve 13. A winding method for the coil 18 will be described below with reference to FIGS. 5 through 7.

In the lens drive device 1 in accordance with at least an embodiment of the present invention, a changing part 133a for changing a drawing direction of the coil 18 is formed at the same position as the first end part 133 in the optical axis direction. The changing part 133a is used to apply tension to the coil 18 when the coil 18 is to be wound around the first coil winding part 131. A specific state where tension is applied will be described below with reference to FIGS. 5 through 7. In at least this embodiment, the changing part 133a is provided at the same position as the first end part 133. However, the present invention is not limited to this embodiment. For example, the changing part 133a may be provided at the same position as the second end part 134 or the third end part 135 in the optical axis direction. Further, in at least this embodiment, one piece of the changing part 133a is provided but a plurality of the changing parts 133a may be provided. For example, when two pieces of the changing part 133a are provided at positions across a recessed part 133b described below, tension can be applied to the coil 18 irrespective of a winding direction of the coil 18 in the first coil winding part 131. Further, any size and shape and the like may be applicable to the changing part 133a. Although the changing part 133a is protruded on an outer side in a radial direction of the sleeve 13 but any height may be applicable. In addition, the changing part 133a may be integrally structured in the sleeve 13 as one piece and, alternatively the changing part 133a may be separately formed to be integrated afterward to the sleeve 13.

The second plate spring 15 is disposed near the third end part 135 which is different from the first end part 133 in which the changing part 133a is formed. In at least this embodiment, the changing part 133a is formed by cutting out a part of the first end part 133 to be formed at a location independent from the first end part 133.

The recessed part 133b accommodates a drawn part 18a of the coil 18 (see FIG. 5) which is drawn and guided from the third end part 135 to the first end part 133 in which the changing part 133a is formed. Since the recessed part 133b is provided, the drawn part 18a of the coil 18 is prevented from protruding from inner peripheral faces of the first coil winding part 131 and the second coil winding part 132 and thus regular winding can be performed satisfactorily. A depth of the groove of the recessed part 133b is preferably set to be larger than a diameter of a wire of the coil 18 and, in this case, the drawn part 18a of the coil 18 does not protrude.

In at least this embodiment, the coil 18 is wound around so that it is divided into two upper-and-lower layers. Therefore, the range of the first coil winding part 131 is defined by the first end part 133 and the second end part 134, and the range of the second coil winding part 132 is defined by the second end part 134 and the third end part 135. However, the present invention is not limited to this embodiment. For example, when the coil 18 is wound around without dividing into two upper-and-lower layers, a range of the coil winding part is defined by the first end part 133 and the third end part 135.

Figure 5:
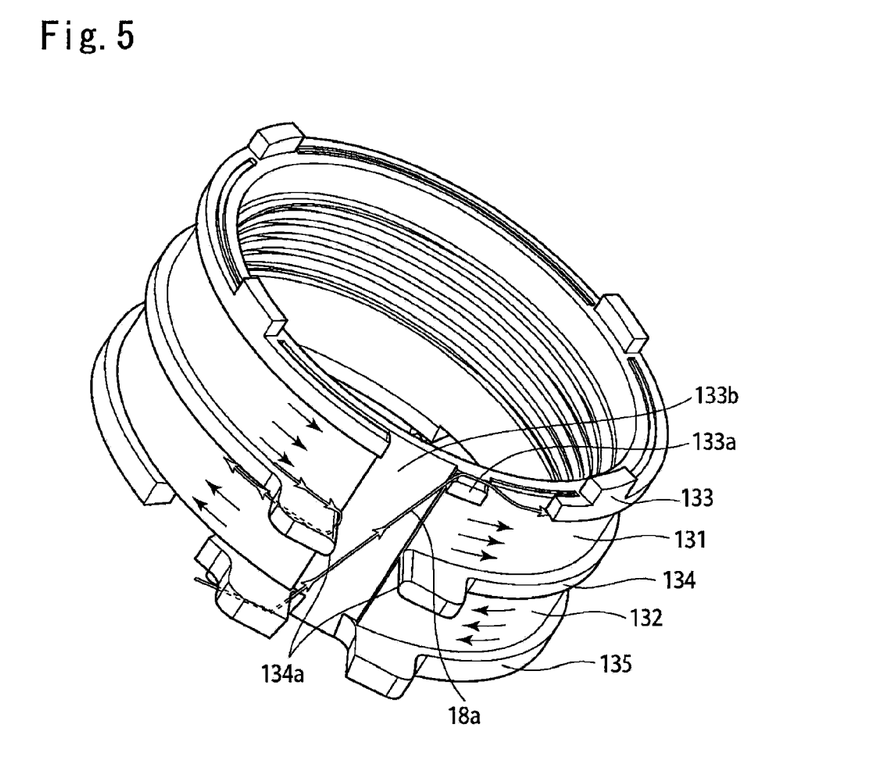
FIG. 5 is a perspective view showing the sleeve for explaining a coil winding method.
Figure 6:
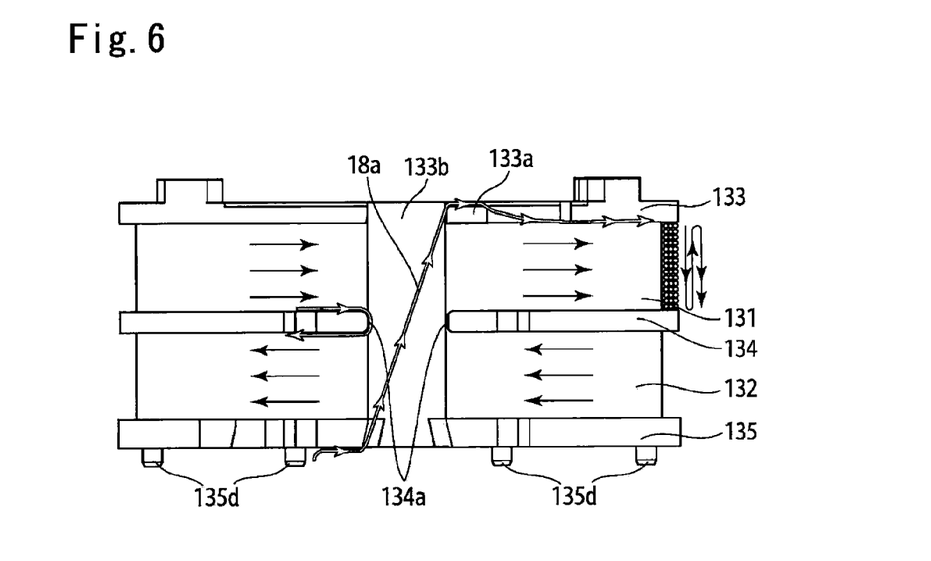
FIG. 6 is a side view showing the sleeve for explaining a coil winding method.
Figure 7:
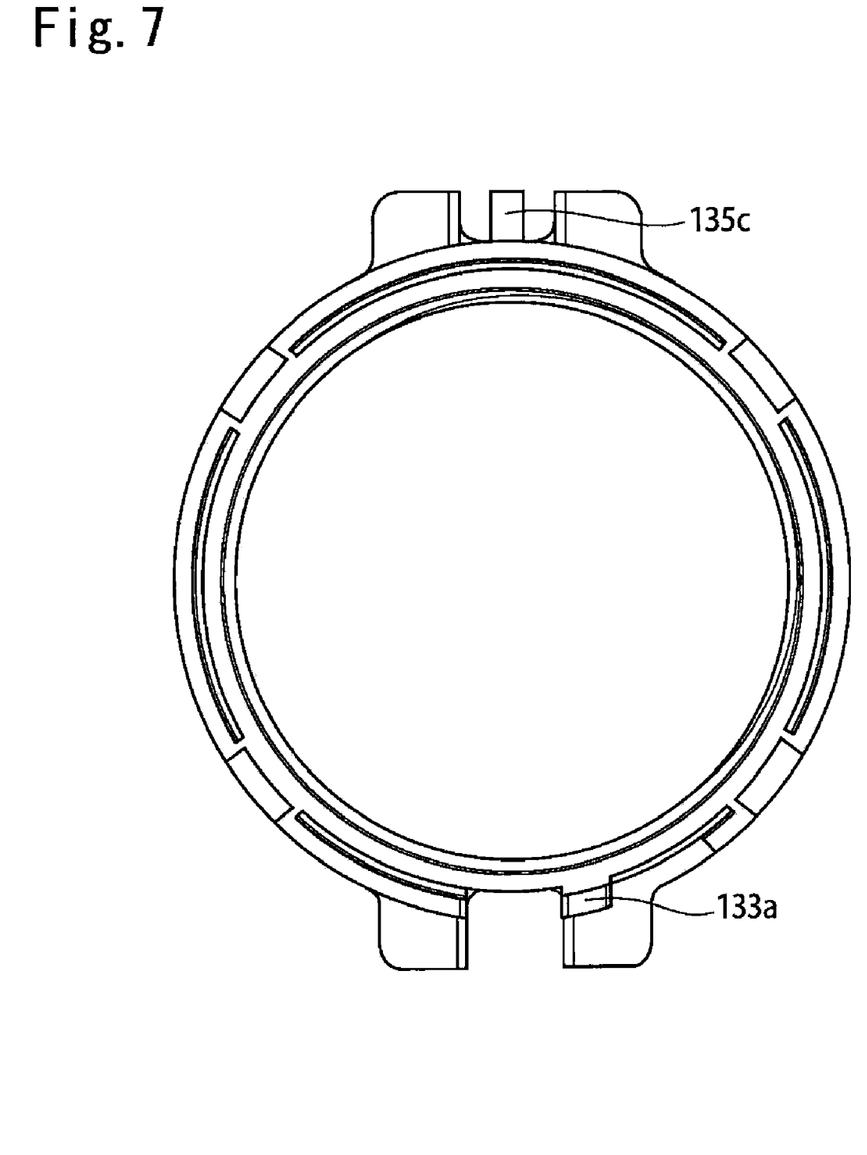
FIG. 7 is a plan view of the sleeve.

FIGS. 5 through 7 are views showing states where the coil 18 is wound around the sleeve 13 shown in FIG. 4. Specifically, FIG. 5 is a perspective view showing the sleeve 13 for explaining a coil winding method, FIG. 6 is a side view showing the sleeve 13 for explaining the coil winding method, and FIG. 7 is a plan view of the sleeve 13.

In FIGS. 5 through 7, firstly, in order to wind the first coil 181 around the first coil winding part 131, the coil 18 is drawn from the third end part 135 side to the first end part 133 side. In this case, a portion which is drawn from the third end part 135 to the first end part 133 is the drawn part 18a, which is passed through the recessed part 133b. Then, the drawn part 18a is engaged with the changing part 133a (see FIGS. 5 and 6) and, after that, the first coil 181 is begun to wind around the first coil winding part 131. In other words, after the drawing direction of the coil 18 is changed by the changing part 133a, the first coil 181 is wound around the sleeve 13 on an outer side of the drawn part 18a in the radial direction. In at least this embodiment, an end face in the optical axis direction of the third end part 135 is formed with a plurality of positioning pins 135d and the second plate spring 15 is mounted on the third end part 135 under a positioned state. Therefore, in at least this embodiment, before the coil 18 is drawn from the third end part 135 to the first end part 133 to be wound, a winding start end part of the coil 18 is wound around either of the positioning pins 135d to be temporally fitted. In this manner, the coil 18 can be wound around under a state where tension is applied to the coil 18. Further, the winding start end part of the coil 18 which is wound around the positioning pin 135d is, after winding of the coil, electrically connected to one of spring pieces structuring the second plate spring 15 by soldering or the like.

As described above, firstly, a "drawing" is performed in which the coil 18 is drawn from the third end part 135, which is different from the first end part 133 where the changing part 133a is formed, to the first end part 133. Then, a "changing" is performed in which a drawing direction of the coil 18 is changed by the changing part 133a.

Next, a "winding" is performed in which the coil 18 is wound around the first coil winding part 131 and the second coil winding part 132. Specifically, a "first winding" is performed in which the coil 18 is wound in a first direction (in at least this embodiment, a counterclockwise direction when the sleeve 13 is viewed from the front side). When the first coil 181 is successively wound around the first coil winding part 131, the drawn part 18a which is disposed in the recessed part 133b has been gradually covered.

In at least this embodiment, the first coil 181 is wound around in three layers on an outer side in the radial direction of the sleeve 13. In FIG. 6, a state in three layers is shown partly. In other words, the coil 18 is successively wound around from a position contacting with the first end part 133 downward and, when the coil 18 has reached to the second end part 134, the winding is turned around, the coil 18 is successively wound around toward the front side where the first end part 133 is provided. After that, when the coil 18 has reached to the first end part 133, the winding is turned around again, and the coil 18 is successively wound around toward the rear side where the second end part 134 is provided.

In this manner, the first coil 181 is overlapped in three layers to the outer side in the radial direction of the sleeve 13. In at least this embodiment, the coil 18 is overlapped in three layers but the present invention is not limited to this embodiment. Any number of layers may be utilized when the coil 18 is overlapped in an odd-number of layers to the outer side in the radial direction of the sleeve 13. For example, when an electromagnetic force based on an electric current flowing through the coil 18 is required to be increased, five layers or seven layers may be utilized.

Next, as shown in FIGS. 5 and 6, a winding direction of the first coil 181 which is reached to the second end part 134 is reversed by the coil guide part 134a. In this manner, the second coil 182 is wound around in an opposite direction, i.e., in at least this embodiment, in a clockwise direction when the sleeve 13 is viewed from the front side.

As described above, the "winding" includes the above-mentioned "first winding", the "reversing" in which the winding direction of the coil 18 in the circumferential direction of the sleeve 13 is reversed by the coil guide part 134a, and the "second winding" in which the coil 18 is wound around in the opposite direction.

Finally, when the second coil 182 has been finished to wind around the second coil winding part 132, the coil 18 is wound around a pin 135c (see FIG. 7), which is formed at an opposite side to the winding start portion of the coil 18, and is temporally fitted. Therefore, the wound coil 18 does not come loose. After that, the winding start and the winding end of the coil 18 are connected by soldering or the like with the second plate spring 15 which is divided into two pieces so as to be electrically separated from each other. In this manner, an electric current can be supplied to the coil 18 from the outside through the second plate spring 15. After the coil has been wound, the winding end of the coil 18 is disengaged from the pin 135c to be electrically connected to the spring piece of the second plate spring 15 by soldering or the like.

According to the coil winding method described above, the drawn part 18a of the coil 18 is covered by the first coil 181 and the second coil 182, which are wound around later, and thus the winding start of the coil 18 can be prevented from coming loose. In accordance with at least an embodiment of the present invention, the coil 18 may be wound around from the lower layer to the upper layer instead of winding from the upper layer to the lower layer. In other words, it may be wound so that the second coil 182 is wound around the second coil winding part 132 and then, the winding direction is changed by the coil guide part 134a and then, the first coil 181 is wound around the first coil winding part 131 and, after that, the coil 18 is engaged with the changing part 133a, and then a winding end portion of the coil 18 is drawn to the third end part 135 side. In this case, the winding end portion of the coil 18 is guided to the third end part 135 through the surfaces (radially outer faces) of the second coil 182 and the first coil 181.

Further, at least an embodiment of the present invention is applicable when an odd-number of layers are wound around even in one coil winding part instead of using two upper-and-lower layers like the embodiment described above. In other words, a projection as the changing part 133a may be formed in the first end part 133 to utilize as a starting point of winding start or to utilize as a turning start point when the coil is drawn to the rear side after winding of the coil has finished.

Further, the winding number is not limited to an odd-number of layers but an even number of levels is applicable but, in this case, the changing part is required to arrange at a different position from the case in at least this embodiment.

In addition, in at least this embodiment, as shown in FIG. 7, the pin 135c is provided on the opposite side to the winding start of the coil 18 but the pin 135c may be similarly provided on the winding start side.

In the lens drive device 1 in accordance with at least an embodiment of the present invention, the movable body is located (held) on an image sensor element side (image side) when the first coil 181 and the second coil 182 are not energized. In this case, the wire spring 16 restricts displacement of the movable body by a magnetic attractive force acting between the magnets 17 and the wire spring 16.

A certain distance between the wire spring 16 and the magnets 17 is maintained and thus the magnetic attractive force between the wire spring 16 and the magnets 17 are prevented from becoming too strong. Therefore, the center axis of the movable body is prevented from being shifted and, as a result, deterioration of a tilt characteristic can be prevented.

In the above-mentioned state, when an electric current is supplied to the first coil 181 and the second coil 182, an electromagnetic force in an upward direction (front side) is applied to the first coil 181 and the second coil 182 respectively. Therefore, the first coil 181, the second coil 182 and the sleeve 13 begin to move on an object to be photographed side (front side).

In this case, elastic forces which restrict movement of the sleeve 13 are respectively generated between the first plate spring 14 and the front end of the sleeve 13, and between the second plate spring 15 and the rear end of the sleeve 13. Therefore, when the electromagnetic force for moving the sleeve 13 to the front side and the elastic forces for restricting movement of the sleeve 13 are balanced, the movement of the sleeve 13 is stopped. Further, when an electric current in an opposite direction is supplied to the first coil 181 and the second coil 182, an electromagnetic force in a downward direction (rear side) is applied to the first coil 181 and the second coil 182 respectively.

In accordance with at least this embodiment, the sleeve 13 (movable body) can be stopped at a desired position by adjusting a current amount supplied to the first coil 181 and the second coil 182 and the elastic forces acting on the sleeve 13 by the first plate spring 14 and the second plate spring 15. When the sleeve 13 is stopped by using balance between the electromagnetic force and the elastic force, occurrence of a collision noise can be prevented, which is different from an example where two separate members are brought into abut with each other such that an engaging part is abutted with another member.

As described above, according to the lens drive device 1 and the coil winding method in accordance with at least an embodiment of the present invention, a drawing direction of the coil 18 is changed by the changing part 133*a* near the winding start of the coil 18 and thus a tension can be applied to the coil 18 (see FIGS. 5 and 6). Therefore, the drawn part 18*a* of the coil 18 can be prevented from coming loose. Especially, since tension is applied to the drawn part 18*a* of the coil 18, a machine such as a coil winding machine can be used and thus a coil winding time can be shortened and workability of a coil winding work can be improved.

Further, the recessed part 133*b* is formed in the sleeve 13 and the drawn part 18*a* is accommodated within the recessed part 133*b* and thus the drawn part 18*a* is prevented from protruding out and, as a result, a satisfactory regular winding can be realized. Further, when the drawn part 18*a* is prevented from protruding, a size of the lens drive device 1 can be reduced.

As shown in FIGS. 5 and 6, the winding direction of the coil 18 is reversed by the coil guide part 134*a*. In this manner, when the coil guide part 134*a* is used, the winding direction can be easily reversed. Further, as shown in FIG. 6, the coil 18 is wound around in three layers and, in at least this embodiment, the coil 18 is wound around in three layers both in the first coil winding part 131 and the second coil winding part 132. In this manner, while a winding number of the coil 18 is secured, a used number of times of the coil guide part 134*a* required to work with hand can be reduced.

The lens drive device 1 may be mounted on various electronic apparatuses in addition to a cell phone with a camera. For example, the lens drive device 1 may be mounted on a PHS, a PDA, a bar code reader, a thin-type digital camera, a monitoring camera, a camera for backward view of a vehicle, a door having an optical authentication function, or the like.

The lens drive device and the coil winding method in accordance with at least an embodiment of the present invention are effective to prevent from coming loose near winding start or winding end of a coil.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
   a movable body which holds a lens and is movable in an optical axis direction;
   a support body which supports the movable body through a spring member; and
   a magnetic drive mechanism which is provided with a coil for driving the movable body in the optical axis direction;
   wherein the movable body comprises:
      a coil winding part around which the coil is wound;
      a first end part and a second end part for restricting a range of the coil winding part in the optical axis direction; and
      a changing part which is formed in the first end part for changing a drawing direction of the coil; and
   wherein the spring member is disposed near the second end part of the movable body to be electrically connected with winding start and winding end of the coil.

2. The lens drive device according to claim 1, wherein the coil includes a drawn part which is drawn from the second end part to the first end part where the changing part is formed and, after a drawing direction of the coil is changed through the changing part, the coil is wound around on an outer side with respect to the drawn part in a radial direction of the movable body.

3. The lens drive device according to claim 2, wherein the coil winding part is formed with a recessed part for accommodating the drawn part.

4. The lens drive device according to claim 1, wherein the movable body is provided with a coil guide part for reversing a winding direction of the coil in a circumferential direction of the movable body.

5. The lens drive device according to claim 4, wherein the movable body is provided with an intermediate end part between the first end part and the second end part, and the intermediate end part is provided with the coil guide part.

6. The lens drive device according to claim 5, further comprising
   a first coil winding part which is formed between the first end part and the intermediate end part;
   a second coil winding part which is formed between the intermediate end part and the second end part; and
   magnets which face the first coil winding part and the second coil winding part respectively;
   wherein faces of the magnets opposite to the first coil winding part and the second coil winding part are respectively magnetized to be different poles from each other.

7. The lens drive device according to claim 1, wherein the coil is wound around in an odd number of layers on an outer side in a radial direction of the movable body.

8. A coil winding method for a lens drive device which is provided with a movable body which holds a lens and is movable in an optical axis direction, a support body which supports the movable body through a spring member, and a magnetic drive mechanism which is provided with a coil for driving the movable body in the optical axis direction, and the movable body is provided with a coil winding part around which the coil is wound, a first end part and a second end part for restricting a range of the coil winding part in the optical axis direction, and a changing part which is formed in the first end part for changing a drawing direction of the coil, comprising:
   drawing the coil from the second end part to the first end part where the changing part is formed;
   changing a drawing direction of the coil by the changing part; and winding the coil around the coil winding part to wind the coil around the movable body.

9. The coil winding method according to claim 8, wherein the movable body is provided with a coil guide part for reversing a winding direction of the coil in a circumferential direction of the movable body, and the winding comprises:

winding the coil around in a first direction;

reversing the winding direction of the coil in a circumferential direction of the movable body by the coil guide part; and winding the coil around a second direction opposite to the first direction.

10. The coil winding method according to claim 9, wherein the movable body is provided with an intermediate end part between the first end part and the second end part, and a first coil winding part is formed between the first end part and the intermediate end part, and a second coil winding part which is formed between the intermediate end part and the second end part, and the intermediate end part is provided with the coil guide part, and wherein, after the first winding is performed, the coil is wound around in the second winding in a second direction opposite to the first direction through the coil guide part provided in the intermediate end part.

* * * * *